United States Patent Office 2,943,703
Patented July 5, 1960

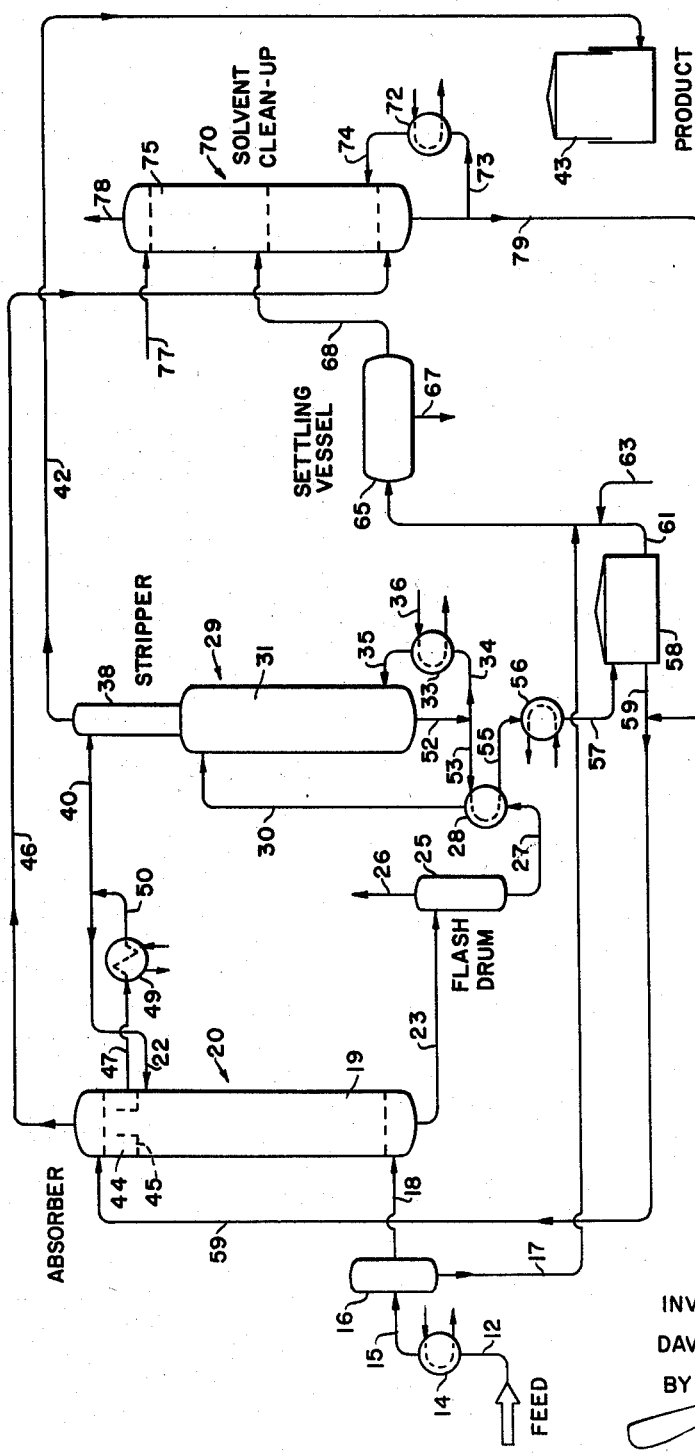

2,943,703
ACETYLENE RECOVERY

David S. Thayer, Torrance, Calif., assignor to Shell Oil Company, a corporation of Delaware Filed Dec. 3, 1957, Ser. No. 700,458

3 Claims. (Cl. 183—115)

This invention relates to the separation of acetylene from a gaseous mixture and in particular is useful to the recovery of acetylene from gaseous mixtures resulting from the partial combustion or thermal cracking of natural gas or low molecular weight hydrocarbons, such as propane.

Gaseous mixtures from, for example, the foregoing partial combustions contain in addition to the desired acetylene, several other gases including trace amounts of higher acetylenes and aromatic compounds. There are known solvents and procedures available for the separation of these gaseous components of the mixture from acetylene. However, the higher acetylenes have required special attention and handling primarily because their solubility characteristics closely resemble that of acetylene. Apart from acetone, perhaps the favorite class of solvents now employed for the recovery of acetylene from gas mixtures is that disclosed in U.S. Patent 2,146,488, Scott et al. The preferred solvent mentioned there is dimethyl formamide (DMF). In conventional practice, the higher acetylenes are removed from the gaseous mixture independently of the acetylene itself. The solubility of diacetylene, for example, in DMF is appreciably greater than the solubility of acetylene in the same solvent. Advantage is taken of this fact by scrubbing the gaseous mixture first with a very small amount of DMF to remove the diacetylene. The diacetylene-free gaseous mixture then flows to the bottom of an acetylene absorber wherein the acetylene is stripped from the gas. This procedure requires two systems for the recovery of the solvent for recirculation.

An object of this invention is to provide an improved and simplified procedure for the separation of acetylene from the higher acetylenes in the fractionation of a gaseous mixture.

Another object of the invention is to provide a more economical and efficient manner of cooling the recirculated, lean absorbent employed in an acetylene recovery process.

These and other objects will become more apparent from the description of the invention which will be made with reference in part to the accompanying drawing, wherein the sole figure is a schematic diagram of a preferred system for performing the process of the invention.

Conventionally, as pointed out above, the higher acetylenes have been removed independently of the acetylene from the gaseous mixture undergoing treatment. It has now been discovered that the higher acetylenes and acetylene may be conveniently removed together and efficiently separated from each other by selectively stripping from their common solvent. In the improved process a gaseous mixture having a preferably low moisture content, first is contacted in an absorption zone with a substantially water-free, high boiling liquid absorbent, to dissolve therein the acetylene and the higher acetylenes. The absorbent should have a high solvency for all of the acetylene compounds, and characterized by its solvency being adversely affected by an increase in the amount of water present. The absorbent has a boiling point much in excess of the boiling points of the acetylene and of water. The acetylene is then recovered from the absorbent without an appreciable removal of the higher acetylenes occurring. Next, at least a portion of the now higher acetylene-enriched absorbent is diluted with water to form a precipitate which contains the higher acetylenes. The precipitate is separated from the water diluted absorbent and the absorbent stripped to remove the water, and the lean absorbent then recirculated to the absorption zone.

Normally, only a portion of the higher acetylene-enriched absorbent (from the acetylene stripping operation) need be subjected to further processing before recycling of the absorbent to the absorption zone. It is contemplated that generally only between 15% and 30% of the circulating absorbent from the acetylene stripper need be diluted with water to precipitate the higher acetylenes. The higher acetylenes are present in very small amounts and may be recycled in part, with complete removal from only a portion of the circulating stream being sufficient to keep the higher acetylenes content sufficiently low.

In a preferred embodiment of the process the gas mixture, prior to its introduction to the absorption zone, is dehydrated to lower appreciably its water vapor content and the off-gas from the absorption zone is passed in direct heat exchange to the recirculated lean absorbent before that absorbent is admitted to the absorption zone. The lean absorbent from both the acetylene stripping and, the water stripping operations will have a somewhat elevated temperature which is in excess of the temperature of the off gas. The direct heat exchange of the absorber tops against the warm, lean absorbent is particularly advantageous as this obviates the need for an extensive exchanger surface which would be required for indirect heat exchange. The simplification in process equipment inherent in this invention of an improvement of considerable value in terms of commercial plant design.

Another feature of the improved process comprising passing the off-gas as a stripping medium through the water-diluted absorbent during the previously mentioned stripping operation.

The process of the invention is generally applicable to the extraction of acetylene from mixtures of light gases generally. The product stream of the example following is from a partial oxidation of methane derived from the conventional Sachasse process. The product streams from the thermal cracking of light hydrocarbons as for example in the Wulff process and from the cracking of hydrocarbons in the Schock electric arc process are equally suitable. Furthermore, the separation method of the invention need not be restricted to the recovery of acetylene as a commercial product. For instance, on certain occasions total removal of trace acetylene is required from certain streams to facilitate subsequent processing. Conceivably, this could be accomplished by the method of the invention.

The preferred solvent is dimethyl formamide (DMF). However, other high boiling acetylene solvents may be used, for example, butyrolactone, butyrolactam, dioxane, the secondary ethers of trihydric alcohols and diethyl carbonate. Other available solvents include various alkylated amides, e.g. diethyl formamide, dimethyl acetamide, diethyl acetamide, and tetramethyl urea. Other possible solvents are disclosed in the Scott et al. patent infra.

The process may be best viewed as utilizing a dry solvent for its enhanced acetylene solubility and a wet solvent for springing the higher acetylene homologs from the fat solvent stream. The process should be carefully distinguished from other acetylene recovery schemes where considerably higher concentrations of water generally around 5–10% are maintained in the solvent at all points in the system. It is essential to the system of the invention that the recycle lean solvent be substantially water free as this anhydrous condition is not only relied upon to reduce considerably the solvent requirements of the system but also to permit the subsequent separate recovery of the higher acetylenes through water springing. For the foregoing reasons it is also desirable that the dilute acetylene-containing feed stream should preferably have a low water concentration and depending on the source of the feed stream it may become necessary to dehydrate it before the feed is contacted by the absorbent.

In a preferred operation about 300 gallons per minute of dimethyl formamide are employed for a dilute acetylene feed flow of about 1505 lb. moles per stream hour (approximately 19,574 lbs. per stream hour). Acetylene constitutes about 8.8% by volume of this feed. The solvent feed ratio may be varied considerably; however, for the foregoing feed a solvent flow of 200–500 gallons per minute is generally satisfactory.

The practice of the invention will be described with reference to the drawing, with the recovery of acetylene from a gaseous mixture utilizing dimethyl formamide as the absorbent or solvent. The gaseous mixture from a partial oxidation of methane in a Sachasse process had an approximate percentage volume composition of 8.8% acetylene, 24.6% carbon monoxide, 56.2% hydrogen, 3.4% carbon dioxide, 6.4% methane, 0.4% oxygen, 0.2% ethylene and trace amounts of higher acetylenes and aromatic compounds such as benzene and naphthalene.

Referring to the drawing, a dilute acetylene feed stream at a pressure of about 20 atmospheres gauge and a temperature of 380° F. is introduced through a line 12 to a feed cooler 14. A high pressure feed stream is necessary to the recovery process and normally the pressure will be in excess of 15 atmospheres and preferably around 20 atmospheres gauge. The stream leaves the feed cooler with a reduced temperature, in the neighborhood of about 50° F., and is passed by a line 15 to a water separator 16 where the condensed water is removed from the gas stream. The condensed water is withdrawn from the separator through a line 17. The dehydrated acetylene feed then flows through a line 18 to the bottom of an acetylene absorber tower 20 where the feed passes upwardly through an absorption section 19 of the tower in countercurrent direction to the descending absorbent or solvent dimethyl formamide (DMF), which enters the top portion of the absorption section through a line 22. During the passage of the feed stream through the absorption section of the tower, the acetylene and the trace amounts of the heavier acetylenes present and aromatic compounds such as benzene and naphthalene are absorbed in the DMF and are removed with the absorbent through a line 23 which leaves from the base of the tower and opens into a flash drum 25. Small equilibrium amounts of other gases, such as carbon dioxide, ethane, ethylene, methane, and carbon monoxide are also absorbed in the DMF. The rich absorbent exits from the tower at a temperature in the neighborhood of 60° F.

The off gas from the absorption section enters an overlying absorbent cooling section 44 of the tower through a liquid trap out tray 45. The off gases which may be expected to have a temperature of approximately 50° F. pass in countercurrent direct heat exchange to a stream of the lean absorbent (having an initial temperature of about 120° F.) which is introduced to the top of the absorbent cooling section. The off gases leave the top of the tower through a line 46 and the cooled lean absorbent (at a temperature of about 110° F.) is withdrawn from the bottom of the cooling section through a line 47 and passed to a lean absorbent chiller 49 where its temperature is further lowered to about 50° F. The cooled absorbent leaves the chiller by a conduit 50 which divides into the previous mentioned line 22 and a second line 40.

The pressure on the rich absorbent stream, entering the flash drum 25 is drastically reduced from the high operating pressure of the absorber to about 20 p.s.i.g. which results in a flashing of the light gases. The light gases including carbon dioxide and the other gases previously named leave the flash drum through a conduit 26 and may be passed to the compressor for the feed stream to the acetylene absorber. This achieves a recycling of the light gases to the acetylene absorber to permit the recovery of any acetylene vaporized in the flash drum 25. The light gases so recirculated will then escape in the off gas stream through a line 46 discussed subsequently from the top of the absorber 20.

The flashed rich absorbent is removed from the flash drum through a conduit 27 which opens into a stripper feed heat exchanger 28 where the rich absorbent is passed in indirect heat exchange with a stream of the hot lean absorbent. The temperature of the rich absorbent is raised considerably during its passage through the heat exchanger and is admitted by a line 30 to the top of a stripping section 31 of an acetylene stripper 29. The absorbent which may enter the stripping section with a temperature in the neighborhood of say 180° F., descends through the stripping section, collecting in the stripper bottom. The lean absorbent in the bottom of the stripper is preferably maintained at a temperature in the neighborhood of 310° F. by circulating the absorbent to a stripper reboiler 33. The lean absorbent is moved from the tower through a line 34 to the reboiler and is returned to the tower from the reboiler by a line 35. The reboiler is supplied with a source of high pressure steam through a line 36. The acetylene is volatilized and leaves the stripping section, passing upwardly through the tower to a knock-back section 38. A stream of cooled absorbent at 50° F. enters the top of this latter section through the line 40. The cooled absorbent acts as a reflux and substantially prevents the escape of vapors, excepting the acetylene which leaves the top of the stripper through a line 42 at a temperature of about 55° F. and is collected in a product gas holder 43.

The lean solvent is withdrawn from the base of the acetylene stripper through a line 52 which branches into the aforementioned line 34 and into a second line 53. The latter line leads the relatively hot lean absorbent to the stripper feed heat exchanger 28. The passage of the lean solvent through this heat exchanger reduces its temperature considerably (to about 190° F.) and from there it goes by a line 55 to a lean absorbent cooler 56 where it is cooled to 120° F. and then transferred by a line 57 to an absorbent surge tank 58. The DMF is withdrawn from the surge drum through either a line 59 which recirculates the absorbent to the acetylene absorber or through a smaller line 61. In one design where it is contemplated that DMF will be used, approximately 20% of the absorbent collected in the surge tank leaves by the line 61. There are two water lines opening into this latter line, namely, the previously mentioned line 17 (which removes water from the feed flash drum 16 preceding the absorber) and a process water line 63. The water is added to the DMF to take advantage of the higher-acetylene's insolubility in the aqueous absorbent, thereby precipitating them from the absorbent. Only a relatively small amount of water need be added, say from 1.5 to 3 gallons of water per 100 gallons of the solvent (about 1.5 to 3 volume percent). The water-diluted absorbent is held in a settling vessel 65 for a sufficiently long time to allow the polyacetylene hydrates to separate, which hydrates are removed from the vessel through a line 67. Alternatively, filters may be used to remove the precipitate. The liquid phase is withdrawn from the vessel through a conduit 68 and charged to an intermediate section of a solvent clean up tower 70. The off gases from the acetylene absorber 20 are admitted through the line 46 to the bottom of the clean-up tower. This arrangement achieves a reduction of solvent losses in the off gases. Stripping of any dissolved organic contaminants and water is facilitated by this passage of the absorbent off gases countercurrent to the descending absorbent. A small reboiler 72 is provided for supplying the additional heat necessary for the operation of the tower. The absorbent from the bottom of the tower is circulated through the reboiler by lines 73 and 74. The clean-up tower is provided with a rectifying section 75 which is supplied through a line 77 with fresh water, which acts as a reflux, cutting down the loss of vaporized absorbent. The absorber off gases, the water and the organic contaminants liberated from the absorbent stream leave the tower through a line 78 and may be used as fuel gas. The cleaned up absorbent is withdrawn from the bottom of the tower by a line 79 which opens into the absorbent recycle line 59 leading to the absorber.

In the operation of the system a diluted acetylene feed is first dehydrated to lower its water vapor content. This may preferably be done by cooling the gas to the neighborhood of 50° F. The dehydrated gaseous stream then passes to an acetylene absorption zone. The zone is supplied in countercurrent flow with a high boiling absorbent which will remove substantially all of the acetylene and high acetylenes along with the small equilibrium amounts of ethane, ethylene, methane, carbon dioxide and carbon monoxide. The acetylene-enriched absorbent leaves the absorption zone and is transferred to a flash drum where the pressure on the feed is substantially reduced. Normally, the absorption zone is operated at several atmospheres pressure and the flash drum at a pressure not much in excess of atmospheric. Under these conditions, nearly all the material in the enriched absorbent, other than acetylene, higher acetylenes, and the aromatic compounds are driven off. The flashed enriched-absorbent then goes to a heat exchanger where its temperature is raised before introduction to the acetylene stripper. The stripper is preferably operated at a somewhat elevated temperature, of say 300° F. and is provided with a knock-back section above the stripping section through which the acetylene vapors are passed countercurrently to cooled, lean absorbent. This reflux is employed to forestall the escape of the higher acetylenes with the acetylene vapors. The now higher acetylene enriched-absorbent is withdrawn from the stripper and passed to a surge drum. The material collected in the surge drum is either returned directly to the acetylene absorber as a lean absorbent or passed through a clean up system wherein the higher acetylenes and other contaminants, principally aromatic compounds are removed. The cleaned up solvent is then recirculated to the absorber. It is contemplated that, normally, 80% or thereabouts of the DMF may be returned directly to the tower from the surge drum. The other 20% of the absorbent is diluted with water (which may include the water earlier removed from the gaseous feed) and passed to a settling zone where the dehydrated polyacetylenes separate out. From the separation zone, the liquid absorbent phase goes to a stripping zone wherein the off gases are bubbled through heated absorbent as a stripping medium. The vapor escaping from the latter operation will be made up of the absorber off gas, organic contaminants, and water. The cleaned up absorbent is recirculated to the absorption zone together with the other portion of the absorbent from the surge tank. The lean absorbent is somewhat warm and to cool it, it may be passed in direct heat exchange to the off gas from the absorption zone.

I claim as my invention:

1. In a process for the separation of acetylene from a gas mixture containing acetylene and trace amounts of higher acetylenes, the improvement which comprises contacting the gas mixture in an absorption zone with a substantially water free, high boiling liquid absorbent and dissolving therein the acetylene and higher acetylenes with the undissolved portion of the mixture leaving the zone as an off gas, said absorbent having a high solubility for the various acetylene compounds with its solubility being appreciably decreased with an increase in the amount of water present and said absorbent having a boiling temperature much in excess of the boiling temperatures of the acetylene and of water, releasing the acetylene from the absorbent by heating while retaining substantially all of the higher acetylenes in solution therewith, diluting at least a portion of the higher acetylenes rich absorbent with water to form a precipitate containing the higher acetylenes, separating the precipitate from the water diluted absorbent, stripping the absorbent with the off gas at an elevated temperature to remove the water therefrom to obtain a lean absorbent having a somewhat elevated temperature relative to that of the absorbent within the absorption zone, passing the lean absorbent into direct heat exchange relationship to the off gas, said off gas in said direct heat exchange having a relatively lower temperature than the lean absorbent, and thereafter recirculating the lean absorbent to the absorption zone.

2. A process in accordance with claim 1 wherein the absorbent is dimethyl formamide.

3. In an absorption process for the separation of acetylene from a gas mixture containing acetylene, water vapor, and trace amounts of higher acetylenes, the improvement which comprises dehydrating the gas mixture to significantly lessen its water vapor content, contacting the dehydrated gas mixture in an absorption zone with a substantially water free, high boiling liquid absorbent and dissolving therein the acetylene and higher acetylenes and removing the undissolved portion of the mixture as an off gas, said absorbent having a high solvency for the various acetylene compounds with its solvency being appreciably decreased with an increase in the amount of water present and said absorbent having a boiling temperature much in excess of the boiling temperatures of the acetylenes and of water, releasing the acetylene from the absorbent in a stripping zone through elevation of the temperature of the absorbent, removing the stripped acetylene vapors from the stripping zone and contacting said vapors with a countercurrent flow of lean absorbent to reduce the loss of the higher acetylenes therewith, diluting at least a portion of the resulting higher acetylene-enriched absorbent with water to form a precipitate containing the higher acetylenes, separating the precipitate from the water diluted absorbent, passing the off gas in countercurrent flow through the diluted absorbent to assist in stripping the water therefrom and simultaneously supplying heat to the absorbent being stripped to obtain a lean absorbent having a temperature higher than the temperature of the absorbent of the absorption zone, passing the lean absorbent into direct heat exchange with the off gas from the absorption zone prior to the passage of said off gas to the stripping operation to cool the lean absorbent, said off gas in said direct heat exchange having a relatively low temperature to the temperature of the recirculated absorbent and thereafter circulating the lean absorbent to the absorption zone.

References Cited in the file of this patent

UNITED STATES PATENTS

| | | |
|---|---|---|
| 1,989,273 | Grimme et al. | Jan. 29, 1935 |
| 2,726,734 | Nirenberg | Dec. 13, 1955 |
| 2,727,587 | Karwat | Dec. 20, 1955 |
| 2,738,860 | Lorenz et al. | Mar. 20, 1956 |
| 2,741,332 | Finneran et al. | Apr. 10, 1956 |
| 2,791,290 | Natta | May 7, 1957 |
| 2,838,133 | Schreiner | June 10, 1958 |
| 2,900,044 | Scofield | Aug. 18, 1959 |

FOREIGN PATENTS

| | | |
|---|---|---|
| 712,544 | Great Britain | July 28, 1954 |
| 750,323 | Great Britain | June 13, 1956 |